United States Patent

[11] 3,534,798

| [72] | Inventor | Arthur Sam Ravenhall<br>Solihull, England |
|---|---|---|
| [21] | Appl. No. | 711,285 |
| [22] | Filed | March 7, 1968 |
| [45] | Patented | Oct. 20, 1970 |
| [73] | Assignee | The Dunlop Company Limited<br>London, England<br>a British Company |
| [32] | Priority | March 17, 1967 |
| [33] | | Great Britain |
| [31] | | 12,617/67 |

[54] TYRE CONSTRUCTION
10 Claims, 2 Drawing Figs.

[52] U.S. Cl. ............................................. 152/209
[51] Int. Cl. ..................................... B60c 11/00,
B60c 27/00

[50] Field of Search........................................... 152/209,
324, 325; 96/209

[56] References Cited
UNITED STATES PATENTS

| 177,306 | 4/1956 | Billingsley .................... | 152/209UX |
| 2,696,863 | 12/1954 | Ewart et al.................... | 152/209 |
| 3,384,144 | 5/1968 | Tiborcz ........................ | 152/209 |
| 3,437,120 | 4/1969 | Verdier ....................... | 152/209 |

*Primary Examiner*—George T. Hall
*Attorney*—Stevens, Davis, Miller & Mosher

ABSTRACT: A pneumatic tyre especially a truck tyre, having a carcass of radial construction and a tread having a single, relatively wide, circumferential drainage groove disposed at or adjacent to the midcircumferential plane of the tyre and a plurality of relatively narrow circumferential drainage grooves disposed on each side of the wide groove.

Patented Oct. 20, 1970

3,534,798

INVENTOR
ARTHUR S. RAVENHALL

By Stevens, Davis, Miller & Mosher
ATTORNEYS

TYRE CONSTRUCTION

This invention relates to pneumatic tyres.

The operation of pneumatic tyres in wet conditions requires the rapid removal of water from between the contact area of the tyre tread and the road. That water which is not bodily displaced by the bulk of the tyre in the form of a bulk "bow wave" displacement as it rolls along the ground, can at least partly be drained into grooves or slots formed in the tyre tread. The most difficult area for drainage is that which is nearest the centre of the contact area, at any given time, since the water which tends to be trapped between the tyre and the road in this region has the greatest distance to travel to be thrown clear in bulk from the contact area.

It has been found, however, that the provision of a plurality of wide grooves, which are effective in large volume drainage of water, disadvantageously reduces the amount of tread rubber, for a given width of tyre, available for wear and vehicle support. In addition, wide grooves isolate areas of rubber which are more easily deformable than are areas of rubber separated only by narrow grooves since with narrow grooves the grooves can close up, under load in the contact area, to bring about mutual support of the rubber in the regions of the narrow grooves; the more rigid the support for the tread rubber the less the rate of wear experienced. Moreover, in radial cord carcass tyres, this effect is most desirable adjacent to the tyre shoulders.

According to the invention a pneumatic tyre comprises a carcass of substantially radially extending reinforcing cords and a tread having a single substantially circumferential relatively wide main drainage groove located in the region of the midcircumferential plane of the tyre and a plurality of relatively narrow substantially circumferential subsidiary drainage grooves disposed about the main drainage groove on each side thereof.

The midcircumferential region as referred to in the preceding paragraph and in the appended claims is defined as that region of the tyre tread surface lying between circumferential lines located at a distance of approximately 15 percent of the total tread width on each side of the midcircumferential line of the tyre.

The construction is of particular value for giant tyres and in a preferred arrangement the relatively wide groove is disposed symmetrically with respect to the midcircumferential line of the tyre.

One embodiment of the invention will now be described by way of example with reference to the accompanying drawings of which:

Figure 2:
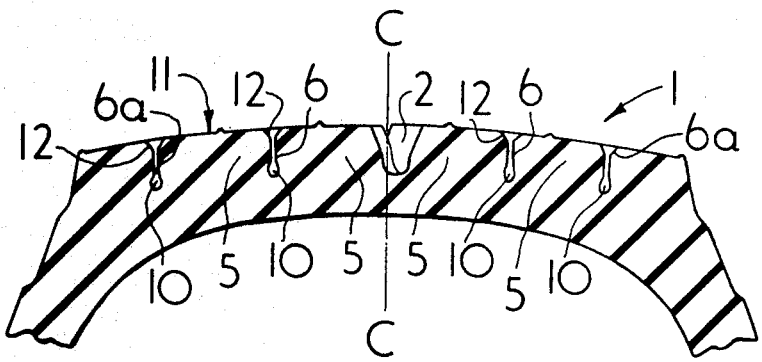
FIG. 2 is a part cross-sectional view of the tyre shown in FIG. 1 taken along line A—A.
Figure 1:
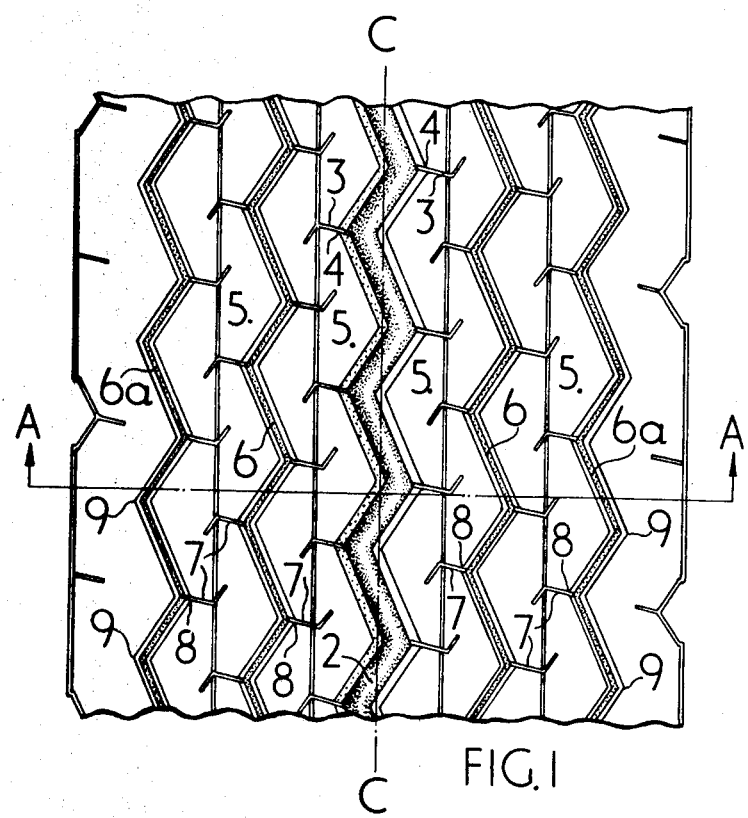
FIG. 1 is a plan view of part of the tread of a tyre according to the invention.

A giant tyre (size 9.00—20) 20) is provided with a tread 1 of width 6.72 inches comprising a single, relatively wide, centrally disposed, generally circumferentially extending zigzag groove 2 of generally V-shaped cross section and of width 0.41 inches at the tread surface 11 of the tyre. The tread also comprises short narrow slots 3 of bent form when viewed in plan which extend generally transversely from each of the peaks of the zigzag groove 2 and connect with it.

The remaining width of the tyre, on each side of the midcircumferential plane C—C, is divided into tread ribs 5 of substantially equal widths by means of narrow zigzag grooves 6 and 6a parallel to the zigzag central groove. The width of the narrow grooves is .05 inches and bent slots 7 are provided extending from all the peaks 8 of the zigzag portions of the narrow grooves 6a, except the axially outwardly pointing peaks 9 of the axially outermost narrow grooves 6 and 6a.

The bases 10 of the narrow grooves 6 and 6a are caused to open out into bulbous cross-sectional form to a width of 15 inches and, at the tread surface 11 of the tyre, the grooves are provided with widening portions 12 in a divergent sense to a width of 0.23 inches, the divergence angle being 90°, with the result that the narrow grooves become substantially wider at the tread surface.

For other sizes of tyres having a similar tread pattern of wide and narrow grooves the corresponding sizes of the various features will be different from those given in the three preceding paragraphs. The following table gives the sizes of various features of the tyre for three sizes of tyres according to the invention, and shows the range of possible sizes of the grooves expressed as a percentage of the tread width.

| | Wide Groove Width | Narrow Groove Width | Bulbous Base Width | Tread Width |
|---|---|---|---|---|
| Tyre Size: | | | | |
| 9.00-20, inch | 0.41 | 0.05 | 0.15 | 6.72 |
| 10.00-20, inch | 0.44 | 0.05 | 0.15 | 7.2 |
| 11.00-20, inch | 0.46 | 0.05 | 0.15 | 7.65 |
| Percent | [1] 5 | [2] 0.75 | [2] 2.5 | 100 |

[1] Minimum.
[2] Maximum.

While in the example described the single wide groove is disposed centrally, in an alternative construction, for example for a motor car tyre, the single wide groove is offset to one side of the midcircumferential plane to an extent of about 15 percent of the total width of the tyre to make an asymmetric tread pattern. In the tyres according to the invention as first described a high degree of water drainage is achieved in the central region of the tread by virtue of the wide groove. Moreover, there is provided a large volume of rubber available for tread wear since relatively narrow grooves are provided to each side of the relatively wide central groove and the rate of wear is low on account of the mutual support of tread rubber when the narrow grooves close together.

I claim:

1. A pneumatic tire comprising:
   a. a carcass of substantially radially extending reinforcing cords and a tread having a single substantially circumferential relatively wide main drainage groove located in the region of the midcircumferential plane of the tire;
   b. a plurality of relatively narrow substantially circumferential subsidiary drainage grooves disposed about the main drainage groove on each side thereof; and
   c. at least one substantially circumferential rib extending around the tire periphery bounded by at least two of the relatively narrow grooves.

2. A pneumatic tire according to claim 1 wherein the base of at least one of the narrow grooves opens out into a bulbous cross-sectional form, and the width of each narrow groove is no more than 0.75 percent of the width of the tire tread.

3. A pneumatic tire according to claim 1 wherein the wide groove is disposed symmetrically with respect to the midcircumferential line of the tyre.

4. A pneumatic tire according to claim 2 wherein the width of the bulbous base of the narrow groove is no more than 2.5 percent of the tread width.

5. A pneumatic tire according to claim 1 wherein the relatively narrow grooves are divergent to become substantially wider at the tread surface.

6. A pneumatic tire according to claim 1 wherein four relatively narrow grooves are provided, two disposed on each side of the relatively wide groove.

7. A pneumatic tire according to claim 1 wherein the relatively wide groove is of zigzag configuration.

8. A pneumatic tire according to claim 7 wherein at least one of the relatively narrow grooves is of zigzag configuration and disposed generally parallel to the zigzag wide grooves.

9. A pneumatic tire according to claim 1 wherein a plurality of relatively short narrow slots are provided, said slots extending generally transversely from at least one of the generally circumferential slots.

10. A pneumatic tire according to claim 1 wherein the width of the wide groove is at least 5 percent of the width of the tyre tread.